United States Patent [19]

Bandyopadhyay

[11] Patent Number: 5,303,882
[45] Date of Patent: Apr. 19, 1994

[54] CORNER VORTEX SUPPRESSOR

[75] Inventor: Promode R. Bandyopadhyay, Providence, R.I.

[73] Assignee: The United States of America as represented by the Secretary of the Navy, Washington, D.C.

[21] Appl. No.: 20,940

[22] Filed: Feb. 22, 1993

[51] Int. Cl.$^5$ .............................................. B64C 23/00
[52] U.S. Cl. ...................... 244/130; 138/37; 244/199
[58] Field of Search ................... 244/199, 130; 138/37, 138/39

[56] References Cited

U.S. PATENT DOCUMENTS

| 2,132,961 | 10/1938 | Morgan | 138/39 |
| 2,650,752 | 9/1953 | Hoadley | 244/199 |
| 3,733,900 | 5/1973 | De Baun | 138/37 |
| 3,964,519 | 6/1976 | De Baun | 138/37 |

OTHER PUBLICATIONS

Pope et al, *Low Speed Wind Tunnel Testing*, Wiley Press 1966 pp. 64, 65, 72, 73.

Primary Examiner—Galen L. Barefoot
Attorney, Agent, or Firm—Michael J. McGowan; Prithvi C. Lall; Michael F. Oglo

[57] ABSTRACT

A corner vortex forms at the corners of a square or rectangular wind tunnel or water tunnel and disrupts the flow and creates excessive drag, turbulence, noise and wake. The corners defined by a wing/fuselage interface creates the same type of situation. The suppressor provides many small corners to prevent forming of the single large vortex. A honeycomb or mesh provides parallel passageways, each having a size that is a fraction (1/5th to 1/10th) of the depth of the boundary layer (defined as that point in the fluid flow where the velocity is 99% of free stream velocity.

5 Claims, 2 Drawing Sheets

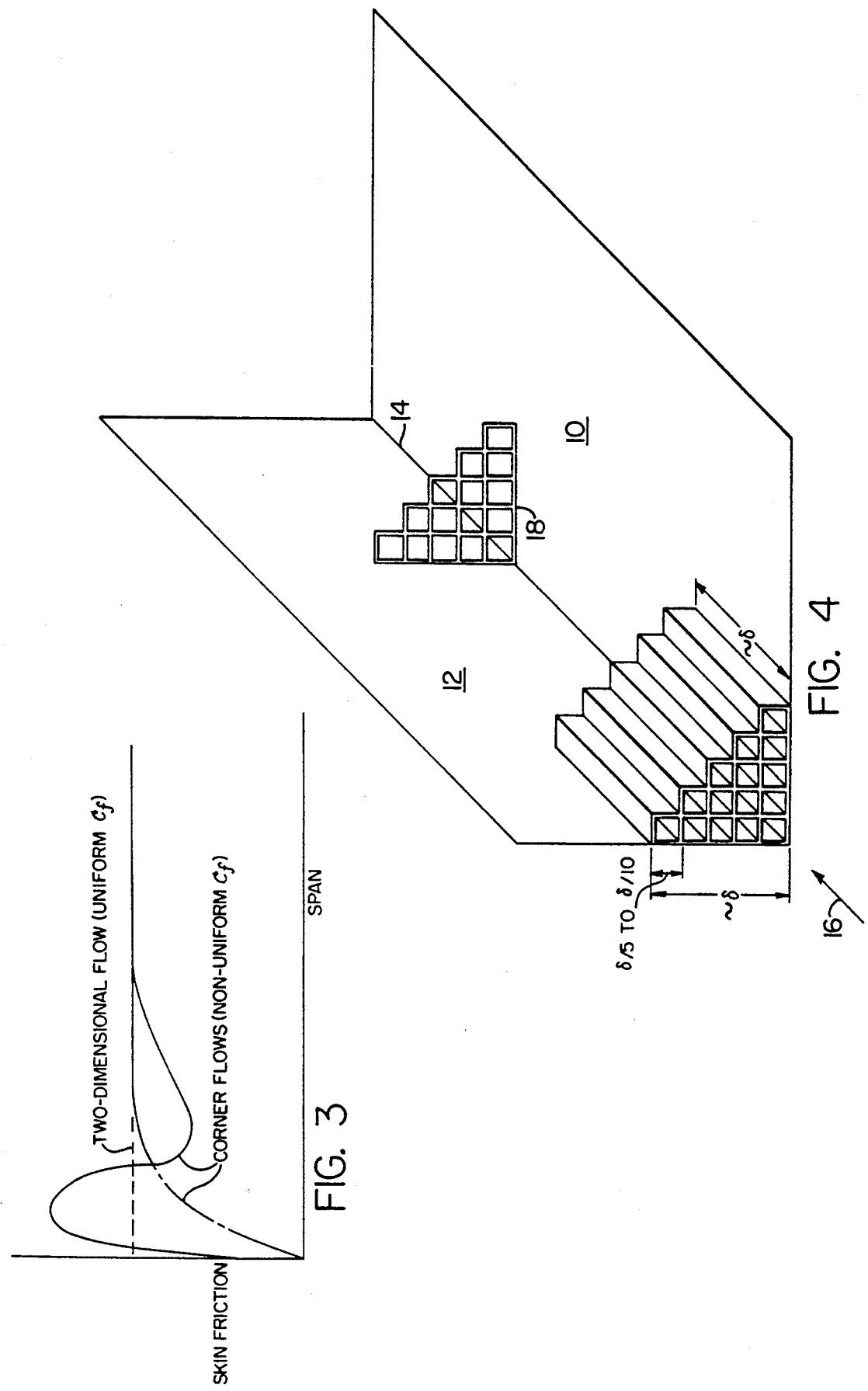

CORNER VORTEX SUPPRESSOR

STATEMENT OF GOVERNMENT INTEREST

The invention described herein may be manufactured and used by or for the Government of the United States of America for governmental purposes without the payment of any royalties thereon or therefore.

BACKGROUND OF INVENTION (1) Field Of Invention

The present invention relates to suppressing the formation and/or growth of a corner vortex of the type formed in a moving fluid passing across structural surfaces at the juncture formed by mutually intersecting surfaces of the structure.

(2) Description of the Prior Art

One of the interesting problems in fluid dynamics is the study of corner vortex. A corner vortex develops or exists at a corner formed by two intersecting flat or curved surfaces. It has a secondary cross-stream flow. It can be a system of several vertices. Wind tunnel tests have shown that a corner vortex produces a three dimensional flow which is undesirable. The corner vortex is produced by a lateral instability mechanism as shown for example in the textbook entitled "The Structure of Turbulent Shear Flow" by A. A. Townsend, Page 331, published by Cambridge University Press, Cambridge, U. K. in 1976, Second Edition. Such theoretical analysis shows that wavelengths up to four boundary layer thicknesses have the potential to grow. That is, the vortex becomes progressively more of a problem as the fluid flows along the corner because as the vortex moves downstream it strengthens causing more drag, turbulence, noise and a long wake as a result.

While vortex generators have been found useful in some applications they depend upon creating a vortex to alleviate problems inherent in a region of fluid flow where separation of the fluid from an underlying surface can be expected to occur. Such vortex generators themselves create large flow separations and have a high degree of drag as discussed in references such as "Vortex Unwinding in a Turbulent Boundary Layer", C. B. McGinley and G. B. Beeler, AIAA Journal of Aircraft, 1987, Vol. 24, No. 3, Pages 221–222. The present invention seeks to alleviate the flow separation caused by a corner vortex at the juncture between mutually intersecting structural surfaces either in a wind tunnel or on an aircraft or water craft.

Examples of prior art patents that disclose various vortex generating devices designed to alleviate the separation of fluid flow from an underlying surface can be summarized as follows:

U.S. Pat. No. 4,378,922 illustrates in FIG. 2 a series of longitudinally spaced fins projecting laterally beyond the surfaces of the forward portion of a fuselage or hull structure. These fins generate small vortices at angles of attack where the fuselage itself might tend to generate unpredictable vortices and thereby cause adverse yawing effects on the fuselage.

U.S. Pat. No. 4,429,843 illustrates in FIG. 1 a plurality of projecting fingers 30, 30 provided adjacent the upper surface of an airfoil and oriented in the direction of fluid flow so as to create vortices rotating in opposite directions at the juncture between the inside surface of the fingers and the upper surface of the airfoil. These devices are intended to enhance the lifting capability of the wing presumably by forestalling flow separation of the airfoil across the upper surface at higher angles of attack.

U.S. Pat. No. 4,836,473 suggests both boundary layer suction devices and vortex generators 11, 11 which operate in cooperation with one another to reduce the drag across various structural portions of an aircraft where flow separation is likely to occur.

U.S. Pat. No. 4,863,121 teaches the use of flow aligned riblets of specific geometry that are designed to reduce drag by modifying the turbulent boundary layer. The height of these riblets is related to the boundary layer thickness.

Finally, U.S. Pat. No. 4,697,769 discloses a method for controlling vortices along the leading edges of a delta wing by creating a small disturbance in one or both of the leading edges to alter the lift otherwise produced by the wing so as to create a more uniform vortex along each of the two leading edges of the wing or to actually create a rolling moment by disturbing one leading edge vortex and not the other.

These prior art patents do not show or suggest how to reduce the adverse effects of a corner vortex at the juncture between mutually intersecting structural surfaces either in a wind tunnel test section or on an aircraft or watercraft where the hull or fuselage has a projection such as a wing that creates a corner where propagation of a corner vortex can disrupt the flow of fluid along such corner.

SUMMARY OF THE INVENTION

The general purpose and object of the present invention is to provide a means for suppressing corner vortex generation and/or growth without the necessity for applying continuous suction at the corner and/or by providing structural faring or filleting at the corner.

Another object of the invention is to provide a passive structure for alleviating the adverse effects of a corner vortex, and providing a means for accomplishing this result that is amenable to retrofitting and which does not require substantial changes in the cross sectional configuration of the structure as would be the case in faring or filleting the corner. This technique is passive and thus involves no suction of the fluid.

These objects are accomplished with the present invention by providing a plurality of passageways at the corner, each of which passageways itself defines a plurality of small corners so as to establish a dimensional relationship with the boundary layer thickness of the fluid flow at the corner that denies the actual tendencies of the corner vortex flow to take hold. Each passageway has at least two side walls that defines at least one such corner. The passageways are nested and so arranged as to provide a minimum structural profile to the flow of fluid through the passageways. The passageways extend parallel to the corner in the area normally occupied by the boundary layer itself. The passageways preferably extend to a depth of at least approximately the depth of the boundary layer $\delta$, and the number of passageways is such that each passageway has a cross sectional dimension between opposite sidewalls thereof that lies in the range between $\delta/5$ and $\delta/10$. The dimension $\delta$ is defined as that distance from the surface where the fluid velocity is at least 99% of the free stream velocity 16.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 3 presents graphically the relationship between the coefficient of friction and the spanwise distance from a corner and illustrates the variation in corner flow from that to be expected from conventional two dimensional flow analysis to that encountered in a real fluid; and FIG. 4 shows a corner configuration that has been fitted with vortex flow suppressing structures constructed in accordance with the present invention.

DESCRIPTION OF THE PREFERRED EMBODIMENT

Figure 1:
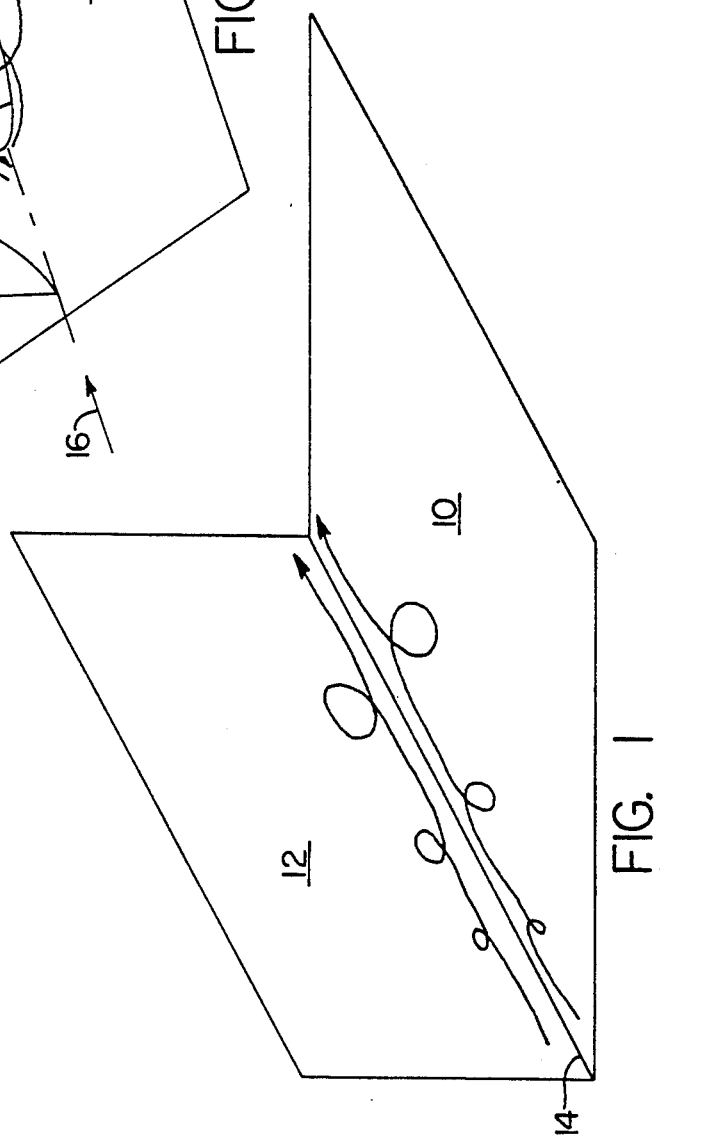
FIG. 1 shows a corner with a corner vortex already established in the flow of a fluid along the corner and across the two surfaces which form the corner.

Referring to FIG. 1, a structure is represented as having at least two angled surfaces 10 and 12 that are oriented at a substantial angle to one another and which form a corner 14 where these surfaces intersect one another. The structure is provided in moving fluid field represented by the flow direction arrow 16 such that the fluid flows in a direction generally aligned with the surfaces 10 and 12 at a velocity V represented by the length of the arrow 16. As a result of the boundary layers created on these surfaces 10 and 12 the fluid adjacent to the surface will have a velocity less than the velocity V of the fluid flow itself. Although the external flow conditions are effectively homogeneous in the direction indicated, the boundary layers create lateral instabilities and small variations in speed which ultimately lead to the creation of a corner vortex or vortices as suggested schematically in FIG. 1. Depending on whether the intersecting surfaces 10 and 12 are flat or curved, the spanwise skin friction due to a corner vortex can be non-uniform as suggested in FIG. 3. The distribution would be uniform (two-dimensional flow) had there been no corner vortex.

Figure 2:
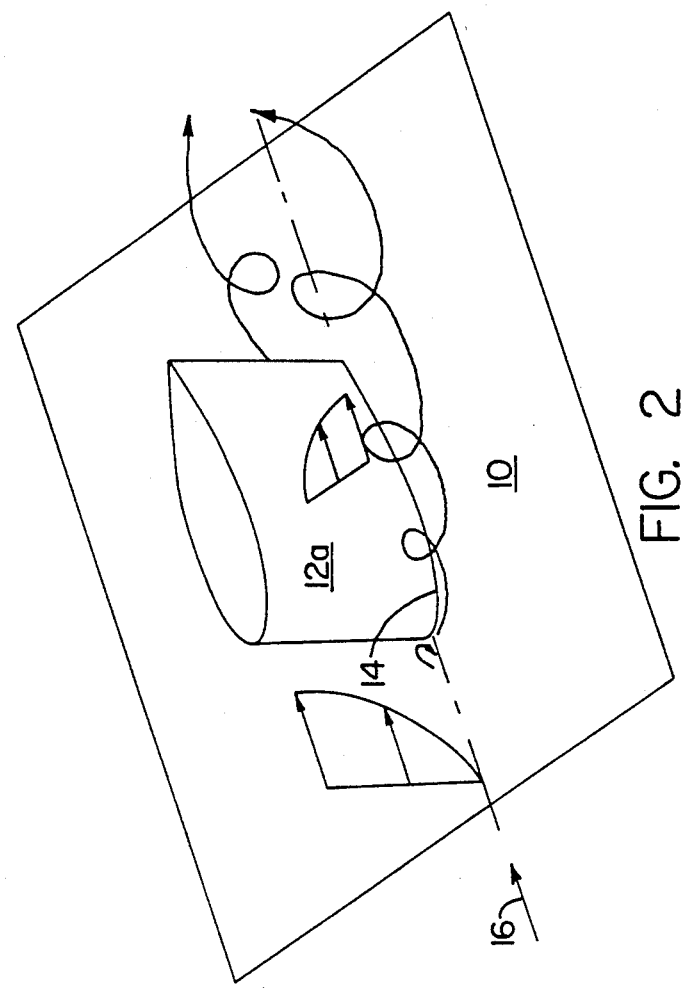
FIG. 2 shows a wall structure and a projecting wing-like structure normal to the wall so as to define mutually related surfaces that define two corners, each of which is amenable to the creation of a corner vortex.

Considering FIG. 2 in greater detail, the wall 10 may comprise a hull structure of a vessel and the wall 12 may comprise a wing-like protuberance or obstacle provided on the wall 10. In any event a corner vortex (also sometimes called a horseshoe or necklace vortex) is formed as a result of the variations in velocity of the boundary layer itself in the area of the corners created by the protuberance or obstacle 12a leading to increased drag on the vessel, and in the case of an underwater vessel such as a submarine leading to the creation of undesirable noise that may subject the vessel to being located by sonar equipment.

Referring now in greater detail to the corner vortex suppressing structure illustrated in FIG. 4 such a structure comprises a honeycomb structure 20 defining a plurality of passageways each of which passageways have small corners that effectively replace the single large corner 14 provided by the wall surfaces 10 and 12.

Assuming that the boundary layer $\delta$ is defined as that surface normal distance from each of the surfaces 10 and 12 to a point in the moving fluid where the velocity is substantially equal to or 99% the free stream velocity 16 it will be apparent that each of the passageways shown has a dimension considerably smaller than $\delta$ and preferably in the range of $\delta/5$ to $\delta/10$.

As shown in the embodiment of FIG. 4 each of the individual passageways is defined by a plurality of generally square openings each of which openings is preferably identical to other adjacent openings and wherein at least five such openings are provided alongside the surfaces 10 and 1 respectively with additional openings provided to occupy the corner space otherwise occupied by the boundary layer.

It should also be noted that these passageways are of limited length and may be comprised of a mesh or screen 18 as shown in FIG. 4. Preferably the structure of the invention comprises passageways of length $\delta$ (that is the thickness of the boundary layer itself) provided at spaced locations along the corner 14.

As shown in FIG. 4 at least one passageway is provided in the corner defined by the surfaces 10 and 12. At least two passageways are provided adjacent to this passageway and at least three passageways are defined adjacent these two passageways. Four passageways are then provided adjacent the three passageways with five passageways provided on a diagonal line that results of fifteen passageways being provided in the cluster shown. It will be apparent that if the dimension of each passageway is reduced to $\delta/10$ that as many as sixty such passageways would be provided in a similar array within the scope of the present invention.

The envelope of the array of passageways can be in the form of an arc instead of the straight line shown. Other variations of the passageway array shown will occur to the person skilled in the art. For example, any non-circular passageway shape might be provided as long as small scale corners are present to replace the single large corner that has been found to cause or create undesirable corner vortex propagation. It will also be apparent that the open area ratio of the honeycomb should be as large as possible while retaining its physical integrity. Blockage and drag should be minimized and a honeycomb arrangement such as that shown should be at least one boundary layer ($\delta$) in length and no longer than two boundary layer thicknesses ($2\delta$). Successive arrays are provided and may be intermixed with a mesh 18 as shown in FIG. 4. These honeycomb/mesh combinations can be repeated along the corner provided only that they be spaced apart by a sufficient distance. About $100\delta$ should be chosen as the spacing between adjacent honeycomb and mesh configurations, or between successive honeycomb arrays.

What is claimed is:

1. In combination, a structure having at least two angled surfaces that are oriented at a substantial angle relative to one another and that form a corner where said surfaces intersect one another, said surfaces provided in a moving fluid such that said structure surfaces are generally aligned with the direction of fluid flow and wherein the fluid has a free stream velocity V, said structure surfaces creating fluid boundary layers adjacent said structural surfaces to a depth $\delta$, said boundary layer depth $\delta$ being measured normal to said structure surfaces to a point in the moving fluid where the velocity is at least 99 per cent of the free stream velocity V, and first means defining a plurality of fluid passageways parallel to said corner, at least one of said passageways provided adjacent said corner and defining at least two passageway sidewalls that define at least one corner of said one passageway, at least two other passageways arranged adjacent said one passageway and defined in part by said one passageway sidewalls, each of said at least two passageways defining at least two sidewalls that in turn define at least one passageway corner and at least two additional passageways arranged adjacent said at least two other passageways and defined in part by said at least two other passageway sidewalls, said at least two additional passageways defining at least two sidewalls that in turn define at least one additional corner, a majority of said passageways having identical cross sectional openings for the passage of fluid in the boundary layers, said passageway sidewalls of adjacent passageways being closely spaced to one another by a distance in the range $\delta/5$ through $\delta/10$ inclusively, said plurality of passageways being confined to the area of said boundary layer, no passageway being provided at a distance from either of the surfaces exceeding $\delta$.

2. The combination according to claim 1 wherein said at least two additional passageways include three such passageways, and wherein said combination further comprises at least four additional passageways beyond said three passageways defining four additional corners spaced from said three corners defined by said at least three passageways and wherein at least five passageways are provided adjacent said at least four passageways to define five corners spaced from said four corners of said at least four passageways, said plurality of passageways numbering at least fifteen.

3. The combination according to claim 2 wherein the number of said passageways is between fifteen and sixty.

4. The combination according to claim 3 wherein said passageways have a length in the flow direction of at least $\delta$, and less than twice $\delta$.

5. The combination according to any of the preceding claims wherein a second means defining a second plurality of passageways is provided downstream of the first means with an interval therebetween of at least $100\delta$.

* * * * *